United States Patent
Kozaki (10) Patent No.: US 11,964,203 B2
(45) Date of Patent: Apr. 23, 2024

(54) INFORMATION PROCESSING SYSTEM FOR DISPLAYING A SCREEN AND AUTOMATICALLY ADJUSTING THE SCREEN

(71) Applicant: Akatsuki Inc., Tokyo (JP)

(72) Inventor: Takuya Kozaki, Tokyo (JP)

(73) Assignee: AKATSUKI INC., Tokyo (JP)

( * ) Notice: Subject to any disclaimer, the term of this patent is extended or adjusted under 35 U.S.C. 154(b) by 0 days.

(21) Appl. No.: 18/346,868

(22) Filed: Jul. 5, 2023

(65) Prior Publication Data
US 2024/0009561 A1    Jan. 11, 2024

(30) Foreign Application Priority Data
Jul. 7, 2022   (JP) .................................. 2022-109816

(51) Int. Cl.
*A63F 13/52*    (2014.01)
(52) U.S. Cl.
CPC .................. *A63F 13/52* (2014.09)
(58) Field of Classification Search
CPC ...... A63F 13/2145; A63F 13/52; A63F 13/25; A63F 13/26; A63F 13/422
See application file for complete search history.

(56) References Cited

U.S. PATENT DOCUMENTS

| | | | | |
|---|---|---|---|---|
| 6,809,776 | B1 * | 10/2004 | Simpson | H04N 21/4782 348/565 |
| 9,251,603 | B1 * | 2/2016 | Kozko | G06T 15/20 |
| 10,751,612 | B1 * | 8/2020 | Urbanus | H04N 21/4781 |
| 11,263,670 | B2 * | 3/2022 | Eatedali | G06Q 30/0631 |
| 2006/0256135 | A1 * | 11/2006 | Aoyama | A63F 13/53 345/629 |
| 2009/0082095 | A1 * | 3/2009 | Walker | A63F 13/35 463/43 |

(Continued)

FOREIGN PATENT DOCUMENTS

| | | |
|---|---|---|
| JP | 2013-248178 A | 12/2013 |
| JP | 6070544 B2 | 2/2017 |

(Continued)

OTHER PUBLICATIONS

Office Action in JP application No. 2022-168597, dated Dec. 22, 2022, 3pp.

*Primary Examiner* — Chase E Leichliter
(74) *Attorney, Agent, or Firm* — HAUPTMAN HAM, LLP (57) ABSTRACT

An information processing system, an information processing apparatus, a program, and an information processing method are less likely to reduce the operability of a game. Within a first screen on which information processing associated with a game is to be performed, a second screen on which predetermined information processing is to be performed is displayed. A screen frame of the second screen is detected based on screen frame data received from a player. The screen frame data specifies the screen frame of the second screen to be displayed. The information processing associated with the game to be performed on the first screen is adjusted based on a position and a dimension of the second screen within the first screen. The position and the dimension of the second screen are detected using the detected screen frame of the second screen.

8 Claims, 7 Drawing Sheets

(56) References Cited

U.S. PATENT DOCUMENTS

| | | | |
|---|---|---|---|
| 2013/0053140 A1* | 2/2013 | Steil | A63F 13/30 |
| | | | 463/30 |
| 2013/0231185 A1* | 9/2013 | Steil | A63F 13/00 |
| | | | 463/35 |
| 2014/0031119 A1* | 1/2014 | Wells | G06Q 20/10 |
| | | | 463/31 |
| 2015/0057081 A1* | 2/2015 | Kelly | G07F 17/3211 |
| | | | 463/31 |
| 2015/0128042 A1* | 5/2015 | Churchill | G06F 3/0488 |
| | | | 715/718 |
| 2016/0142760 A1* | 5/2016 | Son | H04N 21/4316 |
| | | | 725/49 |
| 2017/0278546 A1* | 9/2017 | Xiao | G11B 27/34 |
| 2018/0020041 A1* | 1/2018 | Heeter | H04N 21/41407 |
| 2018/0264367 A1* | 9/2018 | Cotter | H04L 69/04 |
| 2020/0014961 A1* | 1/2020 | Ramaswamy | |
| | | | H04N 21/234345 |
| 2020/0160405 A1* | 5/2020 | Eatedali | G06F 40/30 |
| 2020/0310627 A1* | 10/2020 | Ning | G06F 9/451 |
| 2021/0110632 A1* | 4/2021 | Nelson | G07F 17/3211 |
| 2021/0314659 A1* | 10/2021 | Gao | H04N 21/4223 |
| 2021/0336998 A1* | 10/2021 | Ahn | H04L 65/1089 |
| 2022/0019319 A1* | 1/2022 | Yamamoto | G06F 3/04817 |
| 2022/0072424 A1* | 3/2022 | Lee | A63F 13/422 |
| 2022/0076612 A1* | 3/2022 | Nagao | G03B 17/18 |
| 2022/0108668 A1* | 4/2022 | Fan | G06F 3/147 |
| 2022/0215442 A1* | 7/2022 | Eatedali | G06Q 50/01 |
| 2022/0254321 A1* | 8/2022 | Ogiso | G09G 5/395 |
| 2022/0292915 A1* | 9/2022 | Saffari | G07F 9/001 |
| 2022/0374136 A1* | 11/2022 | Chang | G06F 3/04845 |
| 2022/0394345 A1* | 12/2022 | Backor | H04L 67/02 |
| 2023/0017694 A1* | 1/2023 | Cheng | A63F 13/2145 |
| 2023/0027231 A1* | 1/2023 | Smith | H04N 21/47 |
| 2023/0285856 A1* | 9/2023 | Zhang | A63F 13/53 |
| | | | 463/31 |

FOREIGN PATENT DOCUMENTS

| | | |
|---|---|---|
| JP | 2020-162085 A | 10/2020 |
| JP | 2021-193779 A | 12/2021 |
| WO | 2017208839 A1 | 12/2017 |

* cited by examiner

INFORMATION PROCESSING SYSTEM FOR DISPLAYING A SCREEN AND AUTOMATICALLY ADJUSTING THE SCREEN

RELATED APPLICATIONS

The present application claims priority to Japanese Application Number 2022-109816, filed Jul. 7, 2022, the disclosure of which is hereby incorporated by reference herein in its entirety.

BACKGROUND

Technical Field

The present invention relates to an information processing system, an information processing apparatus, a program, and an information processing method.

Description of the Background

Information processing techniques are available for displaying a video screen or an image screen on the display in any terminal device. Such image processing techniques may include displaying, within one surface, one or more other screens.

Patent Literature 1 describes a technique for displaying one or more screens as windows on any video display device. When one or more windows are displayed in an overlaying manner, the window overlaid with the other windows is to be enlarged not to be hidden by the other windows.

A process for displaying a small other screen in a manner overlaying a part of one screen with this type of technique is referred to as picture-in-picture and is widely used as a technique for video processing.

CITATION LIST

Patent Literature

Patent Literature 1: Japanese Patent No. 6070544

BRIEF SUMMARY

In games played on a player terminal such as a smartphone and a game terminal, picture-in-picture may be used to display another screen, such as a video, on a part of the main screen in which the game is being played.

Although picture-in-picture in the game allows the user to view the video while enjoying the game, the other screen being displayed on one screen in which the game is being played may reduce the operability of the game.

In response to the above, one or more aspects of the present invention are directed to an information processing system, an information processing apparatus, a program, and an information processing method that are less likely to reduce the operability of the game.

An information processing system according to an aspect of the present invention implements operations including displaying a second screen, detecting a screen frame of the second screen, and adjusting information processing. The displaying the second screen includes displaying, within a first screen on which information processing associated with a game is to be performed, the second screen on which predetermined information processing is to be performed. The detecting the screen frame of the second screen includes detecting the screen frame of the second screen based on screen frame data received from a player. The screen frame data specifies the screen frame of the second screen to be displayed. The adjusting the information processing includes adjusting, based on a position and a dimension of the second screen within the first screen, the information processing associated with the game to be performed on the first screen. The position and the dimension of the second screen are detected using the detected screen frame of the second screen.

With the above structure, the second screen is displayed within the first screen on which the information processing associated with the game is performed. This allows the player to enjoy the game while receiving the information processed on the second screen.

The second screen displayed within the first screen may reduce the operability of the game on the first screen. In this case, the screen frame of the second screen is detected to adjust the information processing associated with the game performed on the first screen to reduce the likelihood of the operability of the game being reduced.

In the information processing system, the screen frame data is received after first screen adjustment data for performing the adjusting the information processing is received from the player.

In the information processing system, the adjusting the information processing may include adjusting a dimension of a screen frame of the first screen to cause an operation interface for the game displayed on the first screen not to be overlaid with the second screen.

In the information processing system, the adjusting the information processing may include adjusting a position of an operation interface for the game displayed on the first screen to cause the operation interface not to be overlaid with the second screen.

In the information processing system, the adjusting the information processing may include adjusting a dimension of an operation interface for the game displayed on the first screen to cause the operation interface not to be overlaid with the second screen.

The screen frame data processed by the information processing system may be input through an operation of continuously tracing the screen frame of the second screen, or may be input through selection of a position on the second screen (selection of a specific area for the second screen by, for example, tapping an upper frame of the second screen).

An information processing apparatus according to another aspect of the present invention implements operations including displaying a second screen, detecting a screen frame of the second screen, and adjusting information processing. The displaying the second screen includes displaying, within a first screen on which information processing associated with a game is to be performed, the second screen on which predetermined information processing is to be performed. The detecting the screen frame of the second screen includes detecting the screen frame of the second screen based on screen frame data received from a player. The screen frame data specifies the screen frame of the second screen to be displayed. The adjusting the information processing includes adjusting, based on a position and a dimension of the second screen within the first screen, the information processing associated with the game to be performed on the first screen. The position and the dimension of the second screen are detected using the detected screen frame of the second screen.

A program according to another aspect of the present invention causes a computer to implement operations including displaying a second screen, detecting a screen frame of the second screen, and adjusting information processing. The displaying the second screen includes displaying, within a first screen on which information processing associated with a game is to be performed, the second screen on which predetermined information processing is to be performed. The detecting the screen frame of the second screen includes detecting the screen frame of the second screen based on screen frame data received from a player. The screen frame data specifies the screen frame of the second screen to be displayed. The adjusting the information processing includes adjusting, based on a position and a dimension of the second screen within the first screen, the information processing associated with the game to be performed on the first screen. The position and the dimension of the second screen are detected using the detected screen frame of the second screen.

An information processing method according to another aspect of the present invention is implementable with a computer. The method includes displaying a second screen, detecting a screen frame of the second screen, and adjusting information processing. The displaying the second screen includes displaying, within a first screen on which information processing associated with a game is to be performed, the second screen on which predetermined information processing is to be performed. The detecting the screen frame of the second screen includes detecting the screen frame of the second screen based on screen frame data received from a player. The screen frame data specifies the screen frame of the second screen to be displayed. The adjusting the information processing includes adjusting, based on a position and a dimension of the second screen within the first screen, the information processing associated with the game to be performed on the first screen. The position and the dimension of the second screen are detected using the detected screen frame of the second screen.

The technique according to the above aspects of the present invention is less likely to reduce the operability of the game.

DETAILED DESCRIPTION

An information processing system according to an embodiment of the present invention will be described with reference to FIGS. 1 to 12.

Figure 1:
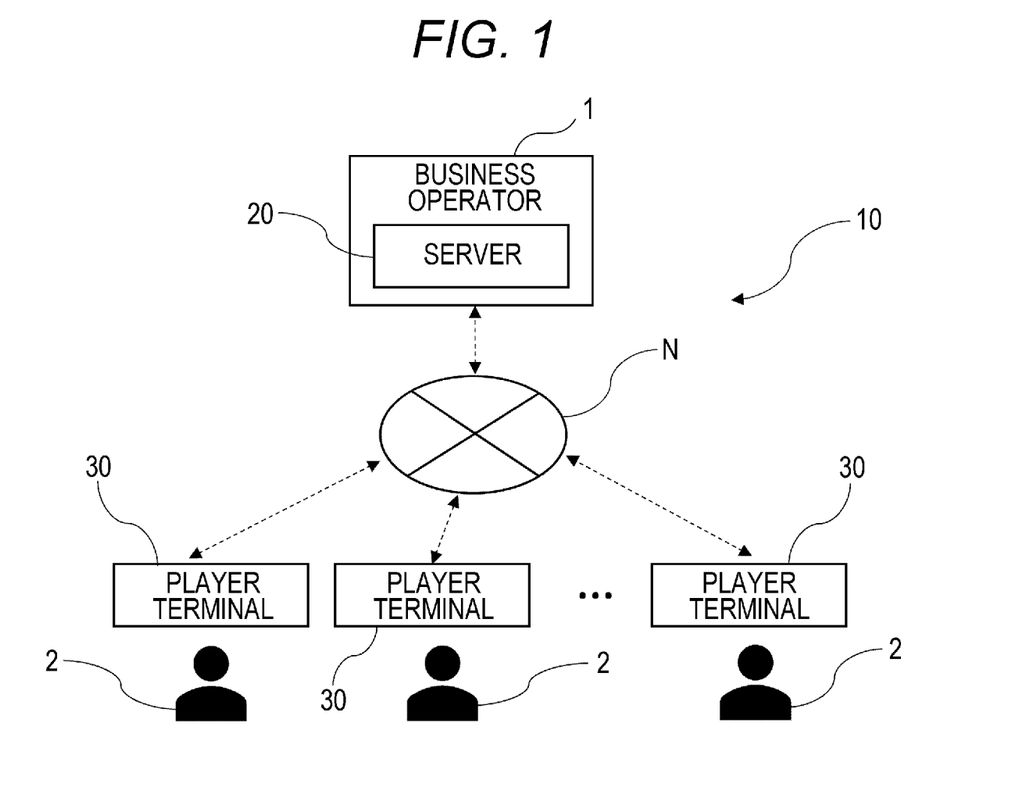
FIG. 1 is a schematic block diagram of an information processing system according to an embodiment of the present invention.

FIG. 1 is a schematic block diagram of the information processing system according to the embodiment of the present invention. As shown in the figure, an information processing system 10 includes, as its main components, a server 20 as an information processing apparatus and multiple player terminals 30. The server 20 and the player terminals 30 are connected through a network N such as the Internet to be accessible to one another.

In the present embodiment, the information processing system 10 provides a game including, for example, an image, a moving image, and sound to the player terminal 30 held by a player 2. The server 20 located in a business operator 1 performs information processing associated with the game and outputs the game with the player terminal 30.

Games to be provided by the business operator 1 in the information processing system 10 include fighting games, puzzle games, action games, baseball games, soccer games, other sport games, quiz games, pinball games, card games, rhythm games, role playing games (RPGs), location-based games, board games, adventure games, casino games, simulation games, strategy games, and racing games.

Figure 2:
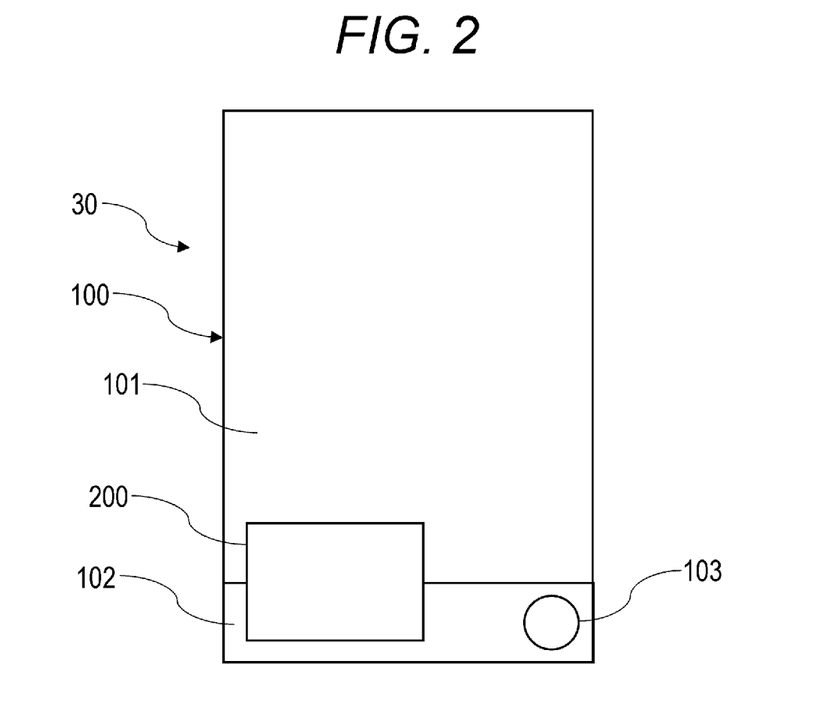
FIG. 2 is a diagram of an example screen interface for a game executed in an information processing system according to the embodiment.

FIG. 2 is a diagram of an example screen interface for a game to be executed with each player terminal 30. As shown in the figure, the display in the player terminal 30 displays a first screen 100 in which the information processing associated with the game is performed, and displays, within the first screen 100, a second screen 200 (picture-in-picture) in which predetermined information processing such as playing a moving image is performed. The second screen being displayed within the first screen refers to the second screen being superimposed on the first screen.

In the present embodiment, the first screen 100 includes a main screen 101 for displaying the progress of gaming, an operation interface 102 for allowing an operation of the game, and an information input interface 103 for allowing an input of first screen adjustment data (described later).

The components of the game system 10 according to the present embodiment will be described.

The server 20 is a desktop computer or a notebook computer in the present embodiment.

Figure 3:
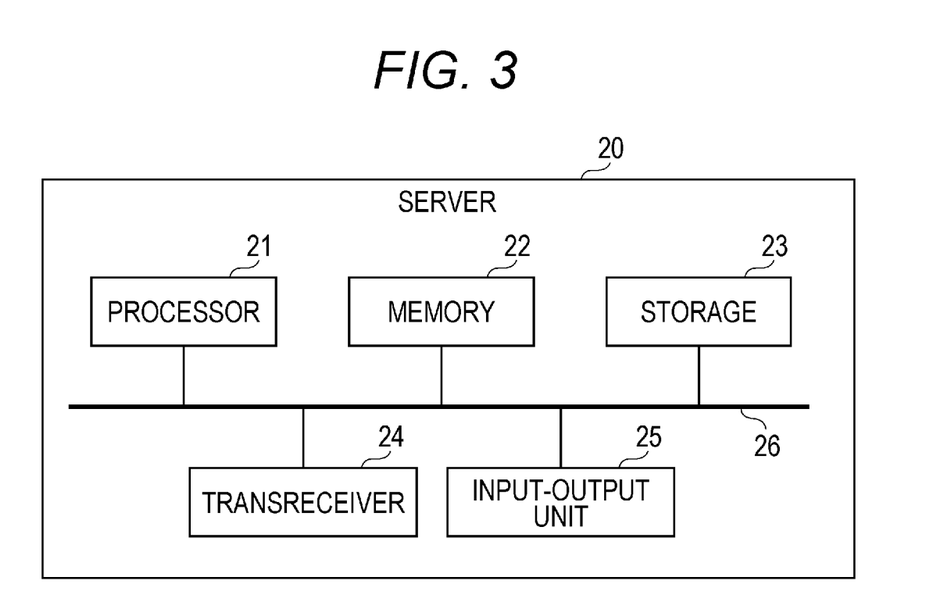
FIG. 3 is a schematic block diagram of a server in the information processing system according to the embodiment.

FIG. 3 is a schematic block diagram of the server 20. As shown in the figure, the server 20 includes a processor 21, a memory 22, a storage 23, a transreceiver 24, and an input-output unit 25. These components are electrically connected to one another with a bus 26.

The processor 21 is an arithmetic unit that controls an operation of the server 20 to control transmission and reception of data between the components, and performs processing for executing an application program.

In the present embodiment, the processor 21 is, for example, a central processing unit (CPU), and performs processing by executing an application program stored in the storage 23 (described later) and loaded into the memory 22.

In the present embodiment, the memory 22 is a main storage device including a volatile storage device such as a dynamic random-access memory (DRAM).

The memory 22 is used as a working area for the processor 21 and stores, for example, a basic input output system (BIOS) executed at the start of the server 20 and also various items of setting information.

The storage 23 stores, for example, programs and information used for various processes.

The transreceiver 24 connects the server 20 to the network N. The transreceiver 24 may include a short-range communication interface such as Bluetooth (registered trademark) or Bluetooth low energy (BLE).

The input-output unit 25 is an interface to which an input-output device such as a keyboard, a mouse, or a display is connected.

The bus 26 connects the processor 21, the memory 22, the storage 23, the transreceiver 24, and the input-output unit 25 for transmission of, for example, an address signal, a data signal, and various control signals between these components.

Figure 4:
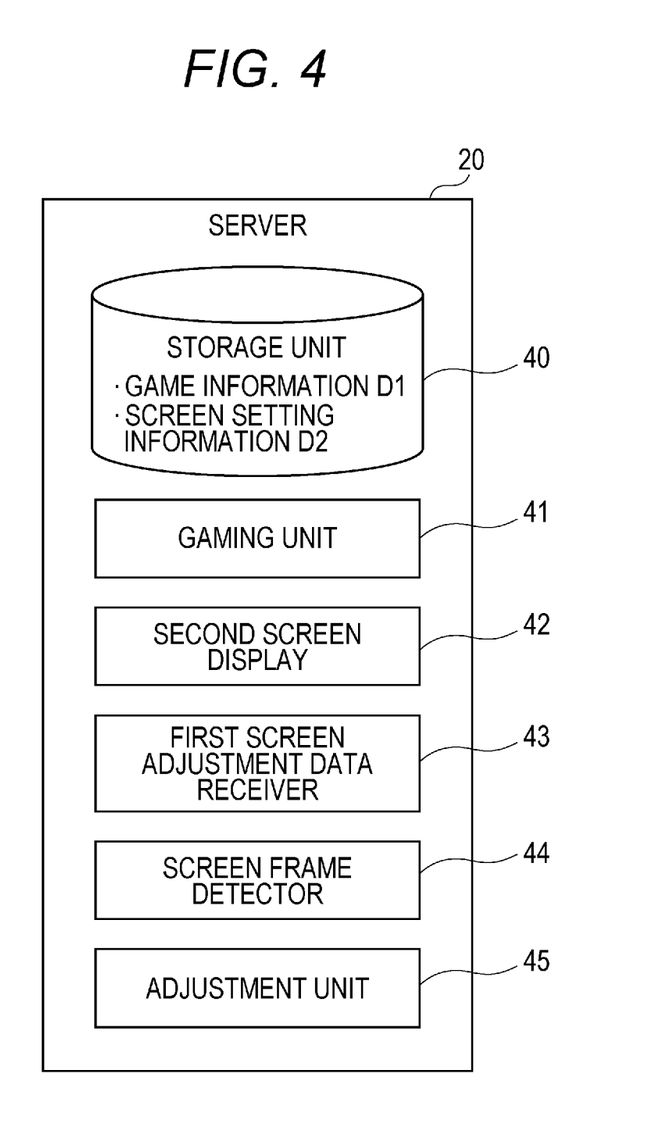
FIG. 4 is a schematic functional block diagram of the server in the information processing system according to the embodiment.

FIG. 4 is a schematic functional block diagram of the server 20. As shown in the figure, in the present embodiment, the server 20 includes a storage unit 40, a gaming unit 41, a second screen display 42, a first screen adjustment data receiver 43, a screen frame detector 44, and an adjustment unit 45.

The storage unit 40 includes storage areas defined in the storage 23. In the present embodiment, the storage unit 40 stores game information D1 and screen setting information D2.

Figure 5:
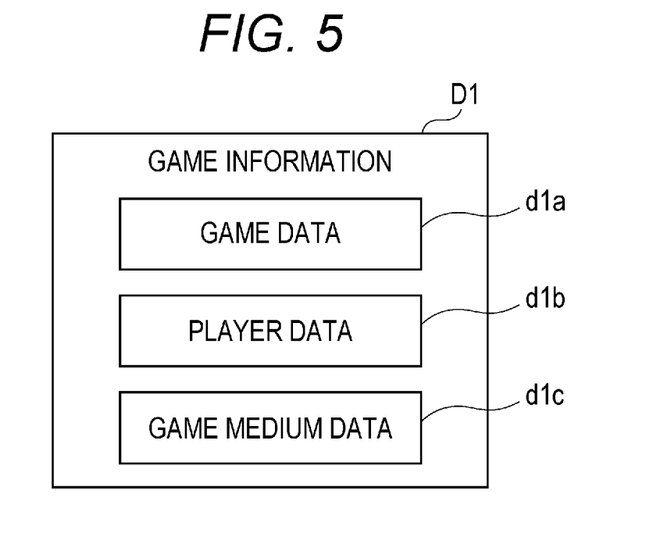
FIG. 5 is a schematic block diagram of game information processed by the information processing system according to the embodiment.

FIG. 5 is a schematic block diagram of the game information D1. As shown in the figure, the game information D1 includes game data d1$a$, player data d1$b$, and game medium data d1$c$.

In the present embodiment, the game data d1$a$ includes various sets of data as appropriate for the type of the game, including a stage name associated with a stage identification (ID), data about an enemy character, or consumed stamina data in games including a quest game.

In the present embodiment, the player data d1$b$ includes data associated with each player in accordance with the corresponding player ID, such as the player's name, the player's level, the number of game media held by the player (e.g., a character or an item), stamina held by the player, consumed stamina, the number of game media acquired by the player, the number of game media consumed by the player, the amount of in-game currency held by the player in a free or non-free game, the number of points held by the player, an amount of in-game currency earned by the player, the number of points acquired by the player, the amount of payment for the player, the number of lottery draws, the results of the lottery draws, the total play time for the player, and the number of the enemies defeated by the player. The stamina is a parameter that is consumed in execution of a unit game and is to be recovered over time. The stamina may be recovered by payment, by using a stamina recovery item held by the player, by using stamina provided from other players such as friends, or by using any other methods. Each player has an upper limit of the stamina. The upper limit may be increased when a condition such as the use of items or the payment is satisfied.

The data associated with the character held by each player 2 includes current values of various parameters associated with the corresponding character ID, such as a level, attack power, defense power, and physical strength of the character. Data for a play stage is data associated with a stage in which each player 2 has played among multiple set stages, and includes the number of plays or the data cleared.

Data associated with the items held by each player 2 includes data for the ownership status of one or more free or non-free items, for example, data associated with the corresponding item ID such as the number of items held by the player 2.

In the present embodiment, the player data d1$b$ further includes data associated with the screen frame of the second screen 200 within the first screen 100, including the position and the dimension of the screen frame.

In the present embodiment, the game medium data d1$c$ is associated with a game medium held by each player 2, such as the character and the item held or the in-game currency used by the corresponding player 2 in the game. The data associated with each character includes various parameters associated with the corresponding character ID, such as the date and time acquired, the name, the level, rarity, a hit point or HP (current value or maximum value), the attributes, a skill, the attack power (current value or maximum value), the defense power (current value or maximum value), or the frequency of use of the character.

The date and time acquired is, for example, data associated with the date and time when the character is provided to the player 2 in the progress of gaming or in the lottery draws. The rarity is, for example, data associated with the character's winning rate of the lottery draws.

The various parameters in the game, such as the HP, the attack power, and the defense power, include the current values as values currently presented by the character, and the maximum values (upper limit values) expected to be presented by the character when the character is trained to the maximum level. The upper limit of each parameter may be increased in response to various conditions such as the use of a specific item, the payment, or clearing a specific stage, or may be decreased when a condition for decreasing the corresponding parameter is satisfied.

The attributes include data associated with categories of the character, for example, a category indicating the strength of the character such as a fire attribute, a water attribute, or a wind attribute in a battle-based game, or a category indicating a team including the character and the position of the character in the team in a sport game.

The skill is data associated with capabilities such as special skills that are allowed to be used by the character. The frequency of use is data associated with the frequency at which the player 2 previously selected or used the character. The frequency of use may be calculated over an entire period of time from when the player 2 starts the game, or may be calculated over any period of time, such as a period of recent few months.

The game medium data d1$c$ includes data associated with the items held by each player 2, for example, data associated with the corresponding item ID such as the number of items held by the player 2.

Figure 6:
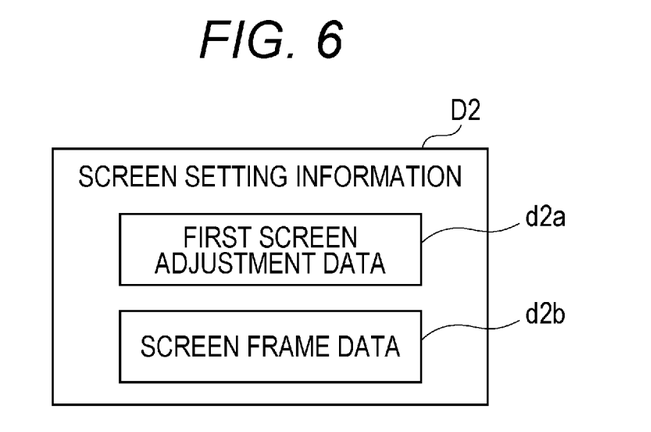
FIG. 6 is a schematic block diagram describing screen setting information processed by the information processing system according to the embodiment.

FIG. 6 is a schematic block diagram describing the screen setting information D2. As shown in the figure, the screen setting information D2 includes first screen adjustment data d2$a$ and screen frame data d2$b$.

In the present embodiment, the first screen adjustment data d2a is used to adjust the first screen 100 in accordance with the second screen 200 displayed within the first screen 100, and the screen frame data d2b is used to specify the screen frame of the second screen 200.

The gaming unit 41, the second screen display 42, the first screen adjustment data receiver 43, the screen frame detector 44, and the adjustment unit 45 shown in FIG. 4 are each implementable with the processor 21 executing the program stored in the memory 22.

In the present embodiment, the gaming unit 41 performs various basic processing, such as progress of gaming, character control, or game mode switching.

In the present embodiment, as shown in FIG. 2, the second screen display 42 performs processing for displaying the second screen 200 within the first screen 100 on the display in the player terminal 30 (second screen display).

In the present embodiment, the first screen adjustment data receiver 43 performs processing for receiving the first screen adjustment data d2a input through the information input interface 103 for the first screen 100 shown in FIG. 2 (first screen adjustment data reception).

In the present embodiment, with the first screen adjustment data d2a received by the first screen adjustment data receiver 43, the screen frame detector 44 receives the screen frame data d2b input by the player 2, and performs processing for detecting the screen frame of the second screen 200 based on the received screen frame data d2b (screen frame detection).

Figure 7:
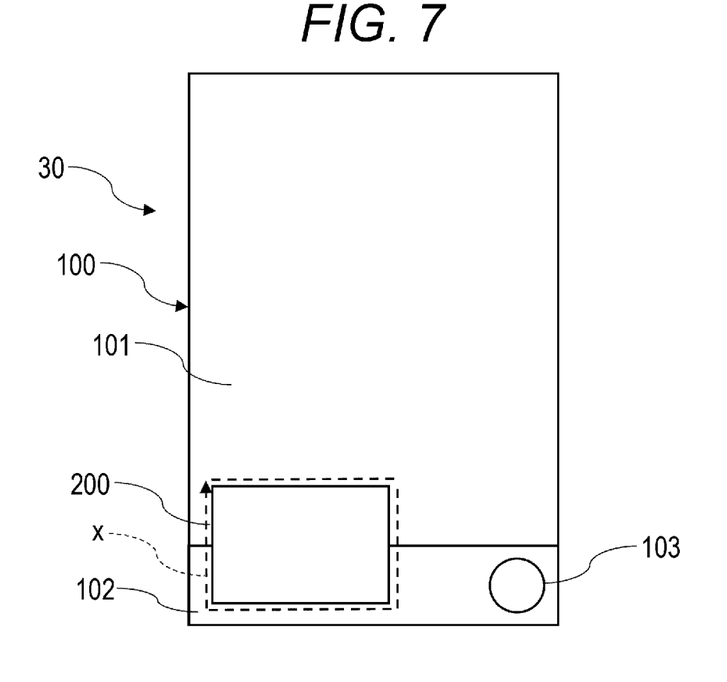
FIG. 7 is a schematic diagram describing screen frame detection performed by the information processing system according to the embodiment.

FIG. 7 is a schematic diagram describing the screen frame detection. As shown in the figure, in the present embodiment, the screen frame detection is to detect the screen frame of the second screen 200 when the frame is continuously placed in contact (with, for example, a finger of or a touch pen held by the player 2 tracing the frame as indicated with a broken line x to input the screen frame data d2b).

In the present embodiment, the screen frame of the second screen 200 is detected when, for example, the position and the dimension of the second screen 200 within the first screen 100 are detected as the data for the screen frame. The position of the second screen 200 within the first screen 100 is detected based on the coordinates. The dimension of the second screen is detected based on the number of pixels.

In the present embodiment, the data for the screen frame detected as above is associated with the player data d1b and stored as the game information D1 into the storage unit.

In the present embodiment, the adjustment unit 45 shown in FIG. 4 performs processing for adjusting the information processing associated with the game performed on the first screen 100 based on the position and the dimension of the second screen 200 within the first screen 100 (adjustment). The position and the dimension are detected based on the screen frame of the second screen 200 detected in the screen frame detection.

Figure 8:
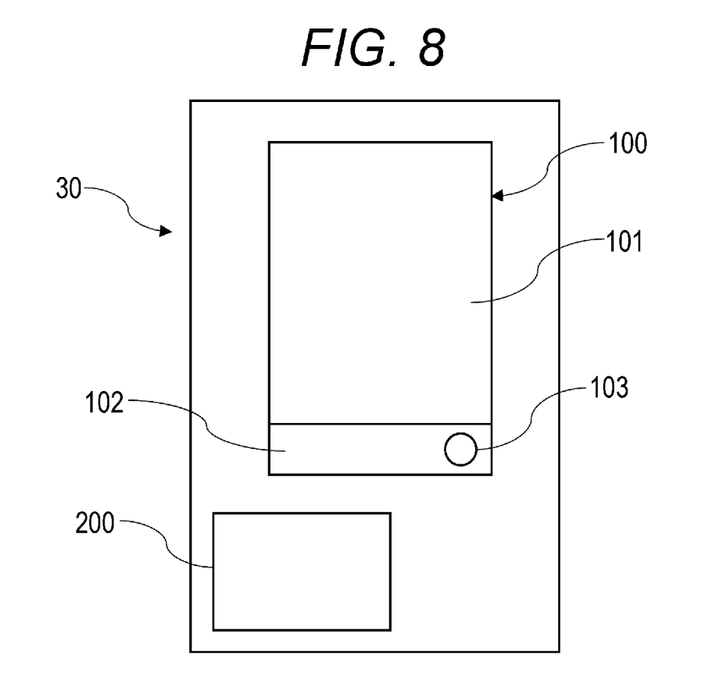
FIG. 8 is a schematic diagram describing adjustment performed by the information processing system according to the embodiment.
Figure 9:
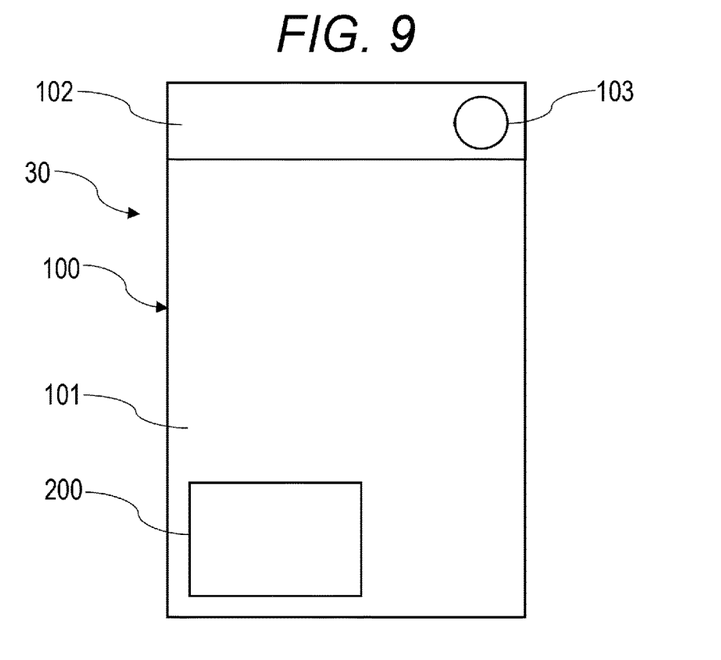
FIG. 9 is a schematic diagram describing the adjustment performed by the information processing system according to the embodiment.
Figure 10:
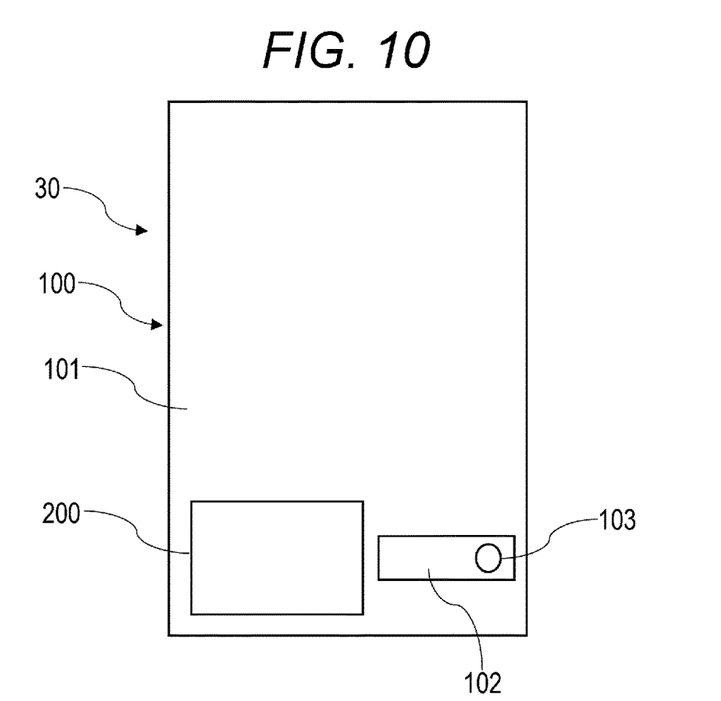
FIG. 10 is a schematic diagram describing the adjustment performed by the information processing system according to the embodiment.

FIGS. 8 to 10 are schematic diagrams each describing the adjustment. As shown in FIG. 8, in the adjustment, to reduce the likelihood that the operation interface 102 for the game displayed on the first screen 100 is overlaid with the second screen 200, the dimension of the screen frame of the first screen 100 may be adjusted.

For example, the dimension of the first screen 100 (e.g., an entire screen of the game) displayed on the display (touchscreen) displayed on the player terminal 30 may be reduced to reduce the likelihood that the operation interface 102 for the first screen 100 is overlaid with the second screen 200. In this case, the size of the first screen is smaller than the entire display in the player terminal.

As shown in FIG. 9, in the adjustment, to reduce the likelihood that the operation interface 102 for the game on the first screen 100 is overlaid with the second screen 200, the position of the operation interface 102 within the first screen 100 may be adjusted.

For example, the operation interface 102 displayed at the lower end of the first screen 100 may be displayed at the upper end of the first screen 100 to reduce the likelihood that the operation interface 102 is overlaid with the second screen 200 displayed in a lower portion of the first screen 100. In this case, the position of the operation interface 102 is not limited to the upper end of the first screen 100. The operation interface 102 may be located at either the left or right end of the first screen 100 to extend along the left or right frame edge or at both the left and right ends, or may be placed at the center of the first screen 100. To visibly present the information displayed on the first screen 100, the operation interface 102 is typically more likely to be located at the ends of the first screen 100 rather than at the center of the first screen 100. However, the operation interface 102 may be located in any other areas of the first screen 100 as appropriate for the information to be displayed on the first screen 100 or the display position of the information. The position of the operation interface 102 may also be changed as appropriate for the information displayed on the first screen 100.

As shown in FIG. 10, in the adjustment, to reduce the likelihood that the operation interface 102 for the game on the first screen 100 is overlaid with the second screen 200, the dimension of the operation interface 102 displayed within the first screen 100 may also be adjusted.

For example, the dimension of the operation interface 102 displayed on the first screen 100 may be reduced to reduce the likelihood that the operation interface 102 for the first screen 100 is overlaid with the second screen 200. Instead of the dimension being reduced, the operation interface 102 may be divided into two or more interfaces (defined areas such as windows or icons). These divided interfaces may be located not to be overlaid with the second screen 200.

In the present embodiment, the game is executed with the player terminal 30 based on the processing performed by the gaming unit 41, the second screen display 42, the first screen adjustment data receiver 43, the screen frame detector 44, and the adjustment unit 45.

In the present embodiment, each player terminal 30 shown in FIG. 1 is a smartphone as a portable information terminal. Each player terminal 30 may be, for example, a game dedicated terminal, a tablet computer, a desktop computer, or a notebook computer.

Figure 11:
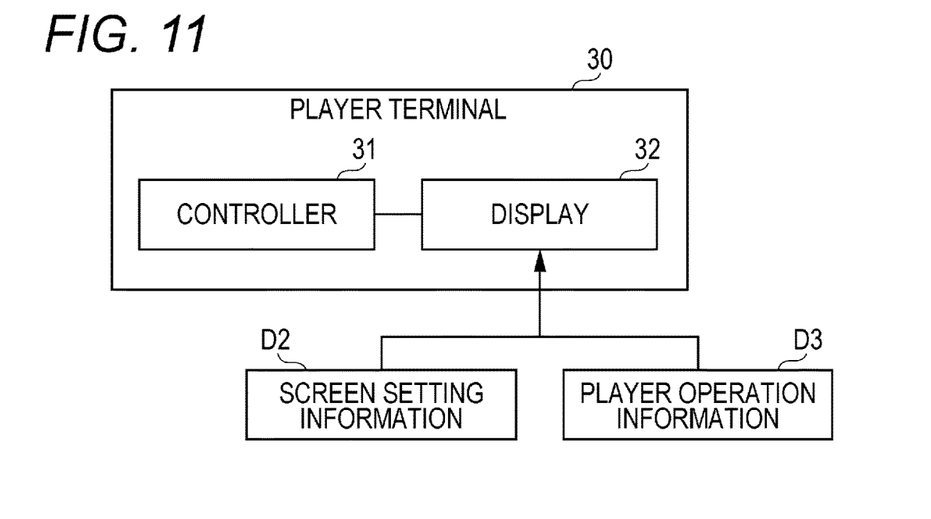
FIG. 11 is a schematic block diagram of a player terminal in the information processing system according to the embodiment.

FIG. 11 is a schematic block diagram of the player terminal 30. As shown in the figure, the player terminal 30 includes, as its main components, a controller 31 and a display 32.

In the present embodiment, the controller 31 controls the components of the player terminal 30 such as the display 32 and a camera (not shown). The controller 31 includes, for example, a processor, a memory, a storage, and a transreceiver.

In the present embodiment, the controller 31 stores a browser for browsing a game application or a website. The controller 31 executes, based on the program in the server 20, the game with the player terminal 30 through the game application or the browser.

In the present embodiment, the display 32 displays a screen interface for the game executed with the player terminal 30, including example screen interfaces shown in FIGS. 2 and 8 to 10.

The display 32 is a touchscreen that receives inputs of information through contact with a display surface. The display 32 is implemented with various techniques such as a resistive film method or a capacitance method.

In the present embodiment, the screen setting information D2 and player operation information D3 are input through the display 32.

In the present embodiment, the player operation information D3 is to be input for the operation or action of the character used by the player 2 in the game.

The screen setting information D2 and the player operation information D3 are input based on a predetermined operation performed by the player 2 on the display 32, such as tapping the screen, swiping the screen, or dragging and dropping the icons displayed on the screen.

A schematic processing sequence of the information processing system 10 in the present embodiment will be described.

Figure 12:
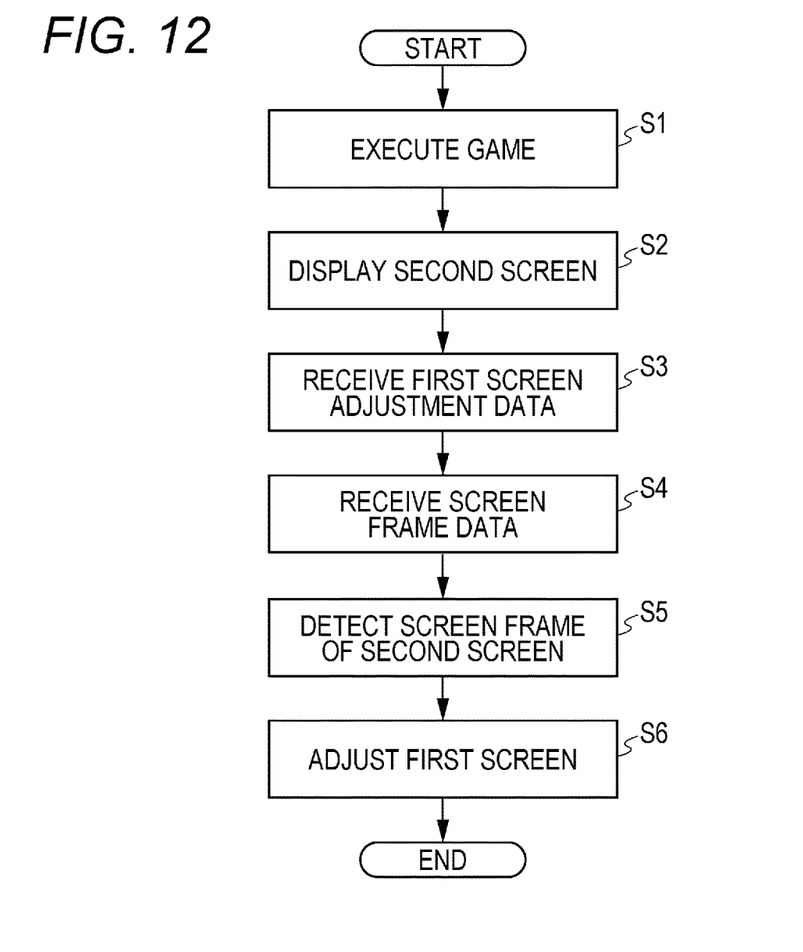
FIG. 12 is a schematic flowchart of processing performed by the information processing system according to the embodiment.

FIG. 12 is a schematic flowchart of processing performed by the information processing system 10 according to the present embodiment. As shown in the figure, in step S1, the player 2 executes the game to progress the game. In the present embodiment, the game progresses on the first screen 100.

In step S2, the second screen 200 is displayed within the first screen 100 in response to start of the game, the progress of gaming, or requests from the player 2 (second screen display). In the present embodiment, a predetermined moving image is played on the second screen 200. The selected moving image may be or may not be associated with the game.

With the second screen 200 being displayed within the first screen 100, the operation interface 102 for the first screen 100 may be hidden by the second screen 200, possibly reducing the operability of the game.

In this case, when the player 2 presses, for example, the information input interface 103 shown in FIG. 2 to adjust the information processing performed on the first screen 100, the first screen adjustment data d2a is generated.

In step S3, the server 20 receives the generated first screen adjustment data d2a (first screen adjustment data reception).

With the first screen adjustment data d2a being received by the server 20, the player 2 inputs the screen frame data d2b. In step S4, the screen frame data d2b is received. In step S5, the screen frame of the second screen 200 is detected based on the received screen frame data d2b (screen frame detection).

In response to detection of the screen frame of the second screen 200, in step S6, the first screen 100 is adjusted to reduce the likelihood that the operation interface 102 for the first screen 100 is overlaid with the second screen 200 (adjustment). The second screen 200 may not at all overlay the operation interface 102 (in other words, the operation interface 102 may be entirely visible), or may partially overlay the operation interface 102 to show a specific area of the operation interface 102. The areas (e.g., the entire area of the operation interface 102 or the specific area of the operation interface 102) to be displayed in the game without the second screen 200 overlaying are previously stored into the storage unit 40.

The adjustment is performed by predetermined operations, such as adjusting the dimension of the screen frame of the first screen 100, adjusting the position of the operation interface 102 displayed on the first screen 100, dividing the operation interface 102, or adjusting the dimension of the operation interface 102 displayed on the first screen 100. In the adjustment, the operations such as adjusting the dimensions, adjusting the position, or dividing the operation interface may be performed automatically based on the conditions predetermined in the information processing system, or may be performed based on inputs from the player selecting one of multiple adjustment options such as adjusting the dimensions, adjusting the position, or dividing the operation interface displayed on the player terminal. The player may predetermine whether the adjustment is performed automatically. In other words, the player may predetermine the on and off states of the screen adjustment function in the information processing system. In this case, the on and off options of the screen adjustment function are displayed on the player terminal. When the player selects and inputs either of the on and off options, the selected option is stored into the storage unit. In response to detection of the second screen, the controller refers to the storage unit to determine whether to perform the screen adjustment.

As described above, the second screen 200 displayed within the first screen 100 in which the information processing associated with the game is performed allows the player 2 to enjoy the game while receiving the information processed on the second screen 200.

The second screen 200 displayed within the first screen 100 may reduce the operability of the game on the first screen 100. In this case, the screen frame of the second screen 200 is detected to adjust the information processing associated with the game performed on the first screen 100 to reduce the likelihood of the operability of the game being reduced.

The present invention is not limited to the above embodiment, but may be modified variously without departing from the spirit and scope of the invention. For example, in the above embodiment, the first screen is used to perform the information processing associated with the games, and the second screen is used to perform the information processing for applications other than the games. In some embodiments, the first screen and the second screen may each be used for information processing associated with any applications, such as playback applications for animations or moving images, in addition to the games. The first screen and the second screen may be used to perform information processing for different applications or for the same application.

In the above embodiment, the screen frame data d2b is input through an operation of continuously tracing the screen frame of the second screen 200. However, the screen frame data d2b may be input by the player 2 touching the second screen 200, for example, tapping the second screen 200 to select the screen frame. The screen frame may also be detected by tapping the four corners of the square second screen frame to select the screen frame. The screen frame of the second screen may be automatically detected in the information processing system. In this case, the screen frame data may not be input.

In the above embodiment, the program stored in the server 20 is used to perform the information processing associated with the game, but the program may be stored in the player terminal 30 and used to perform the information processing associated with the game in the player terminal 30.

The technique according to one or more aspects of the present invention provides the structure described below.

ASPECT 1

An information processing system for implementing operations comprising:
   displaying, within a first screen on which information processing associated with a game is to be performed, a second screen on which predetermined information processing is to be performed;

detecting a screen frame of the second screen based on screen frame data received from a player, the screen frame data specifying the screen frame of the second screen to be displayed; and adjusting, based on a position and a dimension of the second screen within the first screen, the information processing associated with the game to be performed on the first screen, the position and the dimension of the second screen being detected using the detected screen frame of the second screen.

ASPECT 2

The information processing system according to aspect 1, wherein
the screen frame data is received after first screen adjustment data for performing the adjusting the information processing is received from the player.

ASPECT 3

The information processing system according to aspect 1 or aspect 2, wherein
the adjusting the information processing includes adjusting a dimension of a screen frame of the first screen to cause an operation interface for the game displayed on the first screen not to be overlaid with the second screen.

ASPECT 4

The information processing system according to aspect 1 or aspect 2, wherein
the adjusting the information processing includes adjusting a position of an operation interface for the game displayed on the first screen to cause the operation interface not to be overlaid with the second screen.

ASPECT 5

The information processing system according to aspect 1 or aspect 2, wherein
the adjusting the information processing includes adjusting a dimension of an operation interface for the game displayed on the first screen to cause the operation interface not to be overlaid with the second screen.

ASPECT 6

The information processing system according to any one of aspects 1 to 5, wherein
the screen frame data is input through an operation of continuously tracing the screen frame of the second screen.

ASPECT 7

The information processing system according to any one of aspects 1 to 5, wherein
the screen frame data is input through selection of a position on the second screen.

ASPECT 8

An information processing apparatus for implementing operations comprising:
displaying, within a first screen on which information processing associated with a game is to be performed, a second screen on which predetermined information processing is to be performed;

detecting a screen frame of the second screen based on screen frame data received from a player, the screen frame data specifying the screen frame of the second screen to be displayed; and adjusting, based on a position and a dimension of the second screen within the first screen, the information processing associated with the game to be performed on the first screen, the position and the dimension of the second screen being detected using the detected screen frame of the second screen.

ASPECT 9

A program for causing a computer to implement operations comprising:
displaying, within a first screen on which information processing associated with a game is to be performed, a second screen on which predetermined information processing is to be performed;

detecting a screen frame of the second screen based on screen frame data received from a player, the screen frame data specifying the screen frame of the second screen to be displayed; and adjusting, based on a position and a dimension of the second screen within the first screen, the information processing associated with the game to be performed on the first screen, the position and the dimension of the second screen being detected using the detected screen frame of the second screen.

ASPECT 10

An information processing method implementable with a computer, the method comprising:
displaying, within a first screen on which information processing associated with a game is to be performed, a second screen on which predetermined information processing is to be performed;

detecting a screen frame of the second screen based on screen frame data received from a player, the screen frame data specifying the screen frame of the second screen to be displayed; and adjusting, based on a position and a dimension of the second screen within the first screen, the information processing associated with the game to be performed on the first screen, the position and the dimension of the second screen being detected using the detected screen frame of the second screen.

What is claimed is:

1. An information processing system for implementing operations comprising:
displaying, within a first screen on which information processing associated with a game is to be performed, a second screen on which predetermined information processing is to be performed;

detecting a screen frame of the second screen; and adjusting, based on a position and a dimension of the second screen within the first screen, the information processing associated with the game to be performed on the first screen, the position and the dimension of the second screen being detected using the screen frame of the second screen, wherein the adjusting the information processing includes at least one of:
automatically adjusting a dimension of a screen frame of the first screen to cause an operation interface for operating the game displayed on the first screen not to be overlaid with the second screen without changing the position and dimension of the second screen,
automatically adjusting a position of the operation interface for the game displayed on the first screen to cause the operation interface for operating the game displayed on the first screen not to be overlaid with the second screen without changing the position and dimension of the second screen, or
automatically adjusting a dimension of the operation interface for the game displayed on the first screen to cause the operation interface for operating the game displayed on the first screen not to be overlaid with the second screen without changing the position and dimension of the second screen.

2. The information processing system according to claim 1, wherein
the adjusting the information processing is performed in response to a request from a player of the game.

3. The information processing system according to claim 1, wherein
the adjusting the information processing includes adjusting a dimension of a screen frame of the first screen to cause an operation interface for the game displayed on the first screen not to be overlaid with the second screen.

4. The information processing system according to claim 1, wherein
the adjusting the information processing includes adjusting a position of an operation interface for the game displayed on the first screen to cause the operation interface not to be overlaid with the second screen.

5. The information processing system according to claim 1, wherein
the adjusting the information processing includes adjusting a dimension of an operation interface for the game displayed on the first screen to cause the operation interface not to be overlaid with the second screen.

6. An information processing apparatus for implementing operations comprising:
displaying, within a first screen on which information processing associated with a game is to be performed, a second screen on which predetermined information processing is to be performed;
detecting a screen frame of the second screen; and
adjusting, based on a position and a dimension of the second screen within the first screen, the information processing associated with the game to be performed on the first screen, the position and the dimension of the second screen being detected using the screen frame of the second screen, wherein
the adjusting the information processing includes at least one of:
automatically adjusting a dimension of a screen frame of the first screen to cause an operation interface for operating the game displayed on the first screen not to be overlaid with the second screen without changing the position and dimension of the second screen,
automatically adjusting a position of the operation interface for the game displayed on the first screen to cause the operation interface for operating the game displayed on the first screen not to be overlaid with the second screen without changing the position and dimension of the second screen, or
automatically adjusting a dimension of the operation interface for the game displayed on the first screen to cause the operation interface for operating the game displayed on the first screen not to be overlaid with the second screen without changing the position and dimension of the second screen.

7. A program for causing a computer to implement operations comprising:
displaying, within a first screen on which information processing associated with a game is to be performed, a second screen on which predetermined information processing is to be performed;
detecting a screen frame of the second screen; and
adjusting, based on a position and a dimension of the second screen within the first screen, the information processing associated with the game to be performed on the first screen, the position and the dimension of the second screen being detected using the screen frame of the second screen, wherein
the adjusting the information processing includes at least one of:
automatically adjusting a dimension of a screen frame of the first screen to cause an operation interface for operating the game displayed on the first screen not to be overlaid with the second screen without changing the position and dimension of the second screen,
automatically adjusting a position of the operation interface for the game displayed on the first screen to cause the operation interface for operating the game displayed on the first screen not to be overlaid with the second screen without changing the position and dimension of the second screen, or
automatically adjusting a dimension of the operation interface for the game displayed on the first screen to cause the operation interface for operating the game displayed on the first screen not to be overlaid with the second screen without changing the position and dimension of the second screen.

8. An information processing method implementable with a computer, the method comprising:
displaying, within a first screen on which information processing associated with a game is to be performed, a second screen on which predetermined information processing is to be performed;
detecting a screen frame of the second screen; and
adjusting, based on a position and a dimension of the second screen within the first screen, the information processing associated with the game to be performed on the first screen, the position and the dimension of the second screen being detected using the screen frame of the second screen, wherein
the adjusting the information processing includes at least one of:
automatically adjusting a dimension of a screen frame of the first screen to cause an operation interface for operating the game displayed on the first screen not to be overlaid with the second screen without changing the position and dimension of the second screen,
automatically adjusting a position of the operation interface for the game displayed on the first screen to cause the operation interface for operating the game displayed on the first screen not to be overlaid with the second screen without changing the position and dimension of the second screen, or automatically adjusting a dimension of the operation interface for the game displayed on the first screen to cause the operation interface for operating the game displayed on the first screen not to be overlaid with the second screen without changing the position and dimension of the second screen.

\* \* \* \* \*